US011440549B2

(12) United States Patent
Taniguchi et al.

(10) Patent No.: US 11,440,549 B2
(45) Date of Patent: Sep. 13, 2022

(54) AUTOMATED LANE CHANGE CONTROL METHOD AND AUTOMATED LANE CHANGE CONTROL DEVICE

(71) Applicant: Nissan Motor Co., Ltd., Yokohama (JP)

(72) Inventors: Yohei Taniguchi, Kanagawa (JP); Shuko Ishimaru, Kanagawa (JP); Tatsuya Shino, Kanagawa (JP); Atsushi Ito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 203 days.

(21) Appl. No.: 16/968,182

(22) PCT Filed: Feb. 20, 2018

(86) PCT No.: PCT/IB2018/000277
§ 371 (c)(1),
(2) Date: Aug. 7, 2020

(87) PCT Pub. No.: WO2019/162717
PCT Pub. Date: Aug. 29, 2019

(65) Prior Publication Data
US 2021/0370946 A1 Dec. 2, 2021

(51) Int. Cl.
*B60W 30/18* (2012.01)
*B60W 30/095* (2012.01)
(Continued)

(52) U.S. Cl.
CPC .... *B60W 30/18163* (2013.01); *B60W 30/095* (2013.01); *B60W 50/14* (2013.01);
(Continued)

(58) Field of Classification Search
CPC ... B60W 2050/0083; B60W 2050/146; B60W 2540/30; B60W 2554/4041;
(Continued)

(56) References Cited

U.S. PATENT DOCUMENTS 9,836,977 B1 * 12/2017 Cashier .............. G06Q 30/0631
10,710,588 B2 * 7/2020 Geller ............. B60W 30/18163
(Continued)

FOREIGN PATENT DOCUMENTS

JP 2003-63273 A 3/2003
JP 2009-42834 A 2/2009
(Continued)

*Primary Examiner* — Babar Sarwar
(74) *Attorney, Agent, or Firm* — Global IP Counselors, LLP

(57) ABSTRACT

An automated lane change control detects a preceding vehicle that is traveling in a same travel lane as a host vehicle, determines whether a predetermined condition is satisfied between the host vehicle and the preceding vehicle, and executes an automated lane change in the host vehicle after a first predetermined time has elapsed from determining that the predetermined condition is satisfied. The automated lane change of the host vehicle is executed after a first predetermined time has elapsed after determining that the predetermined condition has been satisfied. A second predetermined time is set that is longer than the first predetermined time as a time for prohibiting the automated lane change upon assessing the presents of a previous driver lane change. The automated lane change is prohibited in an interval that starts when a prohibiting condition is satisfied and ends when the second predetermined time elapses.

10 Claims, 7 Drawing Sheets

(51) Int. Cl.
 *B60W 50/14* (2020.01)
 *G08G 1/16* (2006.01)
(52) U.S. Cl.
 CPC ....... *G08G 1/167* (2013.01); *B60W 2050/146* (2013.01); *B60W 2540/30* (2013.01); *B60W 2554/4041* (2020.02); *B60W 2554/4045* (2020.02); *B60W 2554/804* (2020.02); *B60W 2556/10* (2020.02); *B60W 2710/20* (2013.01)
(58) Field of Classification Search
 CPC ... B60W 2554/4045; B60W 2554/802; B60W 2554/804; B60W 2556/10; B60W 2710/20; B60W 30/095; B60W 30/18163; B60W 50/14; G06V 20/56; G08G 1/167
 See application file for complete search history.

(56) References Cited

U.S. PATENT DOCUMENTS

| | | | | |
|---|---|---|---|---|
| 2006/0184321 | A1* | 8/2006 | Kawakami | G01C 21/28 701/411 |
| 2015/0344033 | A1* | 12/2015 | Fukuda | B60W 30/16 701/117 |
| 2015/0360684 | A1* | 12/2015 | Matsuno | B60W 30/18163 701/23 |
| 2016/0091896 | A1* | 3/2016 | Maruyama | B60W 50/10 701/23 |
| 2016/0214612 | A1* | 7/2016 | Kashiba | B60W 10/184 |
| 2016/0347323 | A1* | 12/2016 | Yoshitomi | B60W 40/04 |
| 2017/0341653 | A1* | 11/2017 | Kubota | G01C 21/3658 |
| 2018/0170389 | A1* | 6/2018 | Ochida | B60W 40/04 |
| 2018/0173231 | A1* | 6/2018 | Takae | B60W 30/14 |
| 2018/0339708 | A1* | 11/2018 | Geller | B60L 3/0015 |
| 2019/0016338 | A1* | 1/2019 | Ishioka | G08G 1/167 |
| 2019/0225224 | A1* | 7/2019 | Hashimoto | B60W 50/10 |
| 2019/0263411 | A1* | 8/2019 | Saikyo | G05D 1/0214 |
| 2019/0263412 | A1* | 8/2019 | Saikyo | G06V 20/588 |
| 2019/0265042 | A1* | 8/2019 | Prasad | G01C 21/20 |
| 2019/0283751 | A1* | 9/2019 | Ueda | B60W 60/001 |
| 2019/0299987 | A1* | 10/2019 | Toda | G05D 1/0214 |
| 2019/0315348 | A1* | 10/2019 | Mimura | B60W 30/0956 |
| 2020/0050195 | A1* | 2/2020 | Gross | G05D 1/0255 |
| 2020/0074863 | A1* | 3/2020 | Jung | G08G 1/164 |
| 2020/0298849 | A1* | 9/2020 | Tanaka | B60W 30/0956 |
| 2021/0046936 | A1* | 2/2021 | Umeda | B60W 30/143 |
| 2021/0237739 | A1* | 8/2021 | Hayakawa | B60W 50/14 |
| 2021/0309242 | A1* | 10/2021 | Hayakawa | B60W 50/10 |

FOREIGN PATENT DOCUMENTS

| | | |
|---|---|---|
| JP | 2015-11458 A | 1/2015 |
| JP | 2016-71513 A | 5/2016 |

\* cited by examiner

AUTOMATED LANE CHANGE CONTROL METHOD AND AUTOMATED LANE CHANGE CONTROL DEVICE

CROSS-REFERENCE TO RELATED APPLICATIONS

This application is a U.S. national stage application of International Application No. PCT/IB2018/000277, filed on Feb. 20, 2018.

BACKGROUND

Technical Field

The present disclosure relates to a method and device for automated lane change control in automated driving of a vehicle.

Background Information

In automated driving control of a vehicle, a control has been proposed for automatically changing a lane based on a correlation between a host vehicle and a preceding vehicle traveling in the same lane as the host vehicle (e.g., Japanese Laid-Open Patent Application No. 2003-63273, hereinafter referred to as Patent Document 1).

SUMMARY

When the speed of the preceding vehicle is less than a set speed of the host vehicle, the host vehicle can be automatically moved to a lane different from the preceding vehicle by the control device described in Patent Document 1.

However, there are also cases in which the lane change made by the automated driving does not conform to the intent of the driver. For example, it is possible that after a lane change has been executed in accordance with the intent of the driver, consecutive execution of lane changes by the automated driving will not conform to the intent of the driver.

Therefore, an object of the present disclosure is to realize automated lane change control that respects the intent of the driver in automated driving control.

In order to achieve the above-stated object, the automated lane change control method pertaining to the present disclosure comprises:

detecting a preceding vehicle traveling in a same travel lane as the host vehicle;

determining whether or not a predetermined condition is satisfied based on a correlation between the host vehicle and the preceding vehicle; and executing automatically a lane change by the host vehicle via an automated control after a first predetermined time has elapsed from determining that the predetermined condition is satisfied.

Furthermore, this method comprises:

assessing whether or not a previous lane change made by the host vehicle is in accordance with an intent of a driver, setting a second predetermined time that is longer than the first predetermined time as a time for prohibited the lane change to be performed through the automated control upon assessing that the previous lane change was in accordance with the intent of the driver; and prohibiting the lane change performed through the automated control in an interval that starts when a prohibiting condition that prohibits the lane change performed through the automated control is satisfied and ends when the second predetermined time elapses.

In other words, when the lane change is executed based on the intent of the driver, the lane change performed through automated control is not executed for a fixed time (second predetermined time). As a result, after a lane change based on the intent of the driver is made, it is possible to avoid consecutive execution of lane changes by automated driving. Consequently, automated lane change control that respects the intent of the driver can be realized.

BRIEF DESCRIPTION OF THE DRAWINGS

Referring now to the attached drawings which form a part of this original disclosure.

DETAILED DESCRIPTION OF EMBODIMENTS

Embodiments for implementing the automated lane change control method and device of the present disclosure are described below with reference to the drawings. In the present specification, "automated lane change" is an example of automated driving (described later) and means that the travel lane of a host vehicle is automatically changed in order to avoid approaching a preceding vehicle too closely.

First Embodiment

Figure 1:
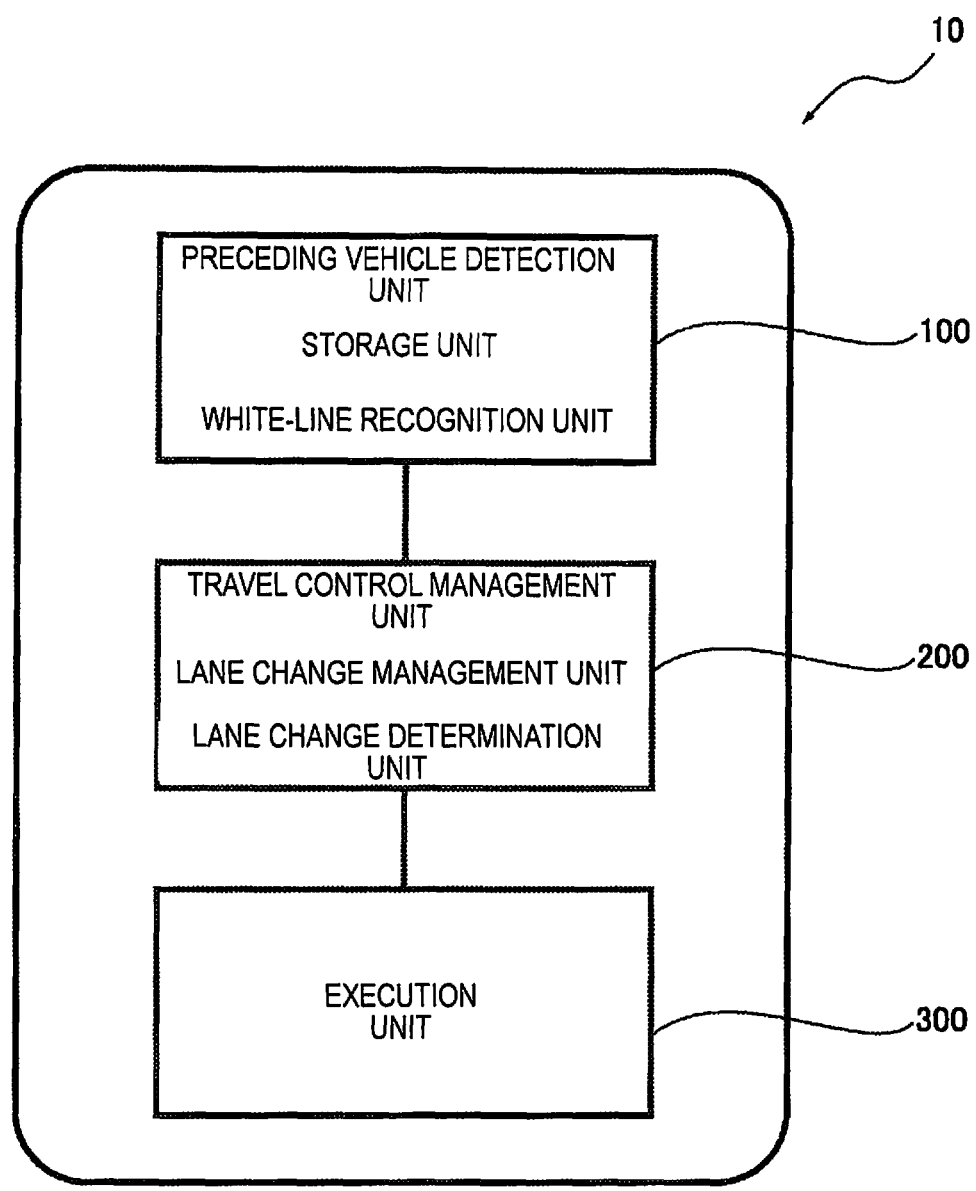
FIG. 1 is a schematic view of the automated lane change control method and device pertaining to the present disclosure.

As shown in FIG. 1, the automated lane change control method and device (host vehicle 10) pertaining to the present disclosure is provided with three main components.

First, the host vehicle 10 has a first unit 100 for acquiring information required for a lane change. The first unit 100 is provided with a preceding-vehicle detection unit, a storage unit, and a white-line recognition unit. The preceding vehicle detection unit detects a preceding vehicle 1 (see FIG. 3) traveling in the same lane as the host vehicle, and acquires the speed of the preceding vehicle 1 and the headway distance from the host vehicle 10. A monitoring unit monitors the surroundings of the host vehicle 10. The storage unit stores acquired information about the preceding vehicle 1. The white-line unit detects a white line and acquires, inter alia, distance between the white line and the host vehicle 10.

Second, the host vehicle 10 has a second unit 200 for managing lane changing made by automated driving. The second unit 200 is provided with a travel control management unit, a lane change management unit 27 (see FIG. 2), and a lane change determination unit. The travel control management unit manages parameters (e.g., set vehicle speed $V_S$ of the host vehicle 10) required for automated driving control. Furthermore, the lane change management unit 27 manages turning automated lane change control on or off, and, when the control is in effect, manages which sequence of the control the host vehicle 10 is in at the current time. The lane change determination unit determines whether an automated lane change is possible based on the surroundings of the vehicle acquired by the monitoring unit of the first unit 100, the correlation between the preceding vehicle and the host vehicle, and other factors. "Automated driving" in the present specification means that at least steering of the host vehicle 10 is carried out automatically. In the automated driving, it is permissible for acceleration and deceleration to be carried out automatically in addition to steering.

Third, the host vehicle 10 has a third unit 300 for executing automated lane change control. The third unit 300 is provided with an execution unit for receiving an automated lane change instruction transmitted from the lane change determination unit of the second unit 200, and controlling the steering and accelerator position of the host vehicle 10.

Figure 2:
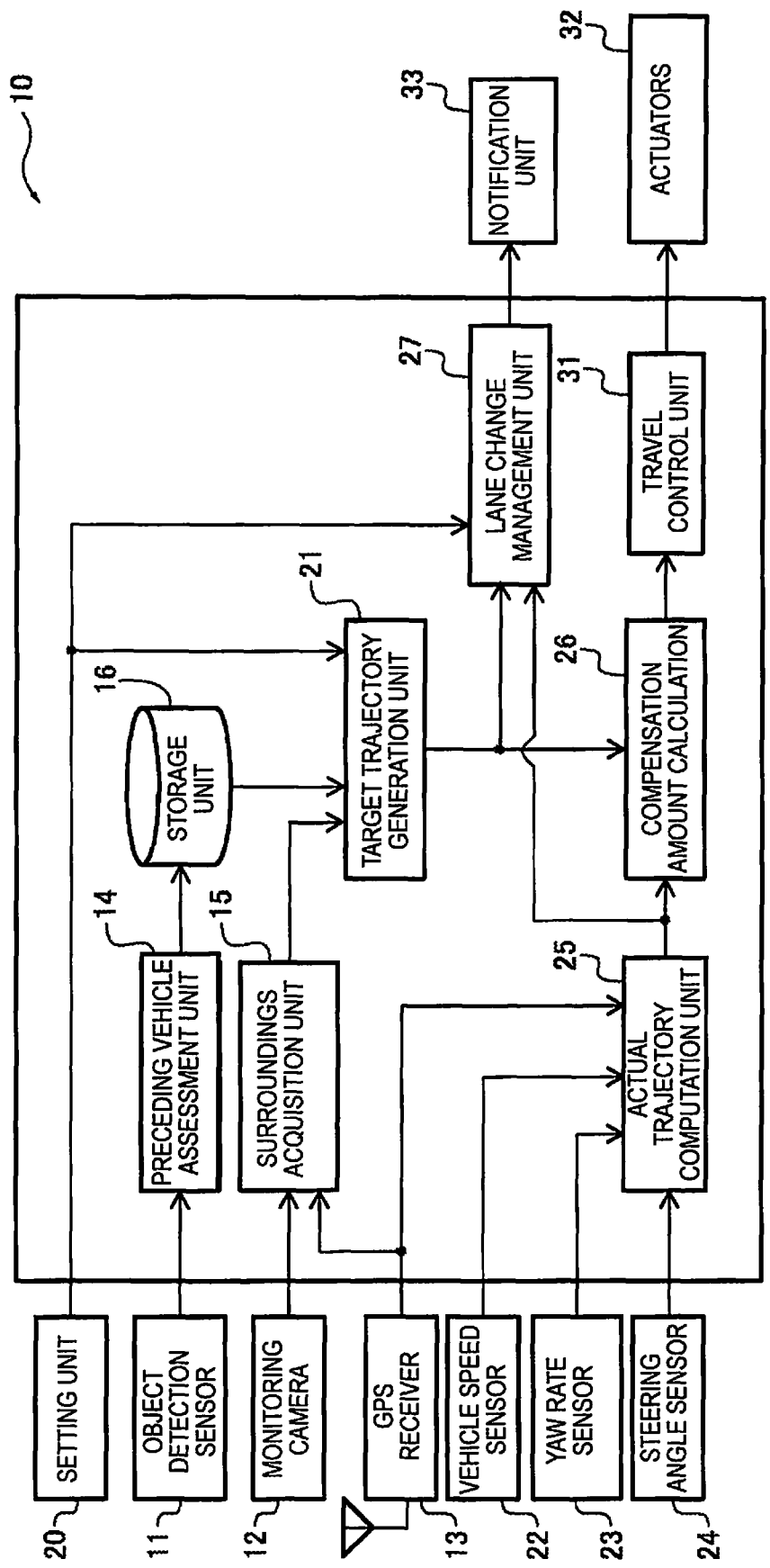
FIG. 2 is a basic configuration diagram of the automated lane change control method and device pertaining to the present disclosure.

The host vehicle 10 will be described in greater detail with reference to FIG. 2.

The host vehicle 10 has an object detection sensor 11, a monitoring camera 12, and a GPS receiver 13. The object detection sensor 11 comprises, e.g., a millimeter-wave radar or a laser radar, and detects objects present in front of the host vehicle 10. The monitoring camera 12 comprises, e.g., a plurality of CCD cameras, and acquires at least images of what is present ahead of or behind the host vehicle 10. The GPS receiver 13 receives radio waves from a GPS satellite to calculate the position of the host vehicle 10.

The detection results produced by the object detection sensor 11 are sent to a preceding-vehicle-assessment unit 14. The preceding-vehicle-assessment unit 14 assesses whether the detected object is a preceding vehicle 1 based on the size, movement speed, and trajectory of the object detected by the object detection sensor 11. The object detection sensor 11 and the preceding-vehicle-assessment unit 14 correspond to a detection unit for detecting a preceding vehicle. The detection unit calculates the headway distance between the preceding vehicle 1 and the host vehicle 10, in addition to the vehicle speed of the preceding vehicle 1, in order to implement automated lane change control.

The plurality of images acquired by the monitoring camera 12 and the position of the host vehicle 10 calculated by the GPS receiver 13 are sent to a peripheral-state-acquisition unit 15. The peripheral-state-acquisition unit 15 acquires the surroundings of the host vehicle 10 based on the images sent from the monitoring camera 12, the position sent from the GPS receiver 13, and map information held in advance. Specifically, a rearward vehicle, an obstacle around the host vehicle, a preceding vehicle traveling in an adjacent lane, and other information are acquired. The monitoring camera 12, the GPS receiver 13, and the peripheral-state-acquisition unit 15 correspond to the monitoring unit for monitoring the surroundings of the host vehicle.

When the preceding vehicle 1 is detected by the preceding-vehicle-assessment unit 14, the current position and current speed of the preceding vehicle 1 is stored in a storage unit 16.

The host vehicle 10 furthermore has a setting unit 20. The driver of the host vehicle 10 can select (input) whether to turn automated lane change control on or off via the setting unit 20. When the automated lane change control is turned on, the set speed for the host vehicle 10 can be inputted. Information inputted via the setting unit 20 is transmitted to a target trajectory generation unit 21. The setting unit 20 comprises various switches and direction indicators (turn signals) provided to an instrument panel or steering wheel in front of the driver's seat.

The target trajectory generation unit 21 generates a target trajectory for when the automated lane change control is executed, based on the information of the preceding vehicle 1 stored in the storage unit 16, the surroundings acquired by the peripheral-state-acquisition unit 15, and the information inputted via the setting unit 20.

The host vehicle 10 is provided with a vehicle speed sensor 22, a yaw rate sensor 23, and a steering angle sensor 24. The detection values detected by the vehicle speed sensor 22, the yaw rate sensor 23, and the steering angle sensor 24, and the information position of the host vehicle 10 calculated by the GPS receiver 13 are inputted to an actual-trajectory-computation unit 25. The actual-trajectory-computation unit 25 calculates the trajectory actually traced by the host vehicle 10 (the actual travel trajectory) based on the inputted values.

The target trajectory generated by the target trajectory generation unit 21 and the actual travel trajectory calculated by the actual-trajectory-computation unit 25 are inputted to a correction amount calculation unit 26. The correction amount calculation unit 26 calculates the difference between the actual travel trajectory with respect to the inputted target trajectory, and multiplies a suitably set correction coefficient and the calculated difference to calculate the correction amount.

The correction amount calculated by the correction amount calculation unit 26 is transmitted to a travel control unit 31. The travel control unit 31 determines values of instructions made to various actuators 32 based on the received correction amount so that the actual travel trajectory and the target trajectory of the host vehicle 10 match. The actuators 32 actuate, inter alia, the steering, accelerator pedal, and brake pedal of the host vehicle 10 based on the received instruction values. In other words, the host vehicle 10 can automatically control the acceleration, deceleration, and steering of the host vehicle 10 based on signals from the travel control unit 31.

The information inputted via the setting unit 20, the target trajectory generated by the target trajectory generation unit 21, and the actual travel trajectory of the host vehicle 10 calculated by the actual-trajectory-computation unit 25 are inputted to the lane change management unit 27. The lane change management unit 27 manages the set speed $V_S$ of the host vehicle 10 and turning automated lane change control on or off based on the inputted information from the setting unit 20. Also, based on the inputted target trajectory and the actual travel trajectory, a determination is made as to which sequence of the control the host vehicle 10 is in when the automated lane change control is executed. The lane change management unit 27 can thereby assess whether the lane change accords with the intent of the driver. The lane change management unit 27 corresponds to an assessment.

In the present disclosure, as above-described, the target trajectory generation unit 21, the actual-trajectory-computation unit 25, the correction amount calculation unit 26, the lane change management unit 27, and the travel control unit 31 are collectively referred to as a control unit. The control unit specifically comprises a processor, etc., and is provided with a non-transitory recording medium that records a program (described later) and is readable by a computer.

The host vehicle 10 has a notification unit 33 provided to, e.g., an instrument panel. The notification unit 33 causes a light to illuminate in a constant or intermittent manner based on the information from the lane change management unit 27 while the automated lane change control (described later) is prohibited, whereby the driver is notified of the prohibited state. Furthermore, or alternatively, the notification unit 33 may display the time remaining in the prohibited interval.

Next, the automated lane change control will be described with reference to FIGS. 3 and 4. The process of the flowchart in FIG. 4 and the processes of the flowcharts of FIGS. 5 to 7 (described later) are executed by the control unit.

Figure 3:
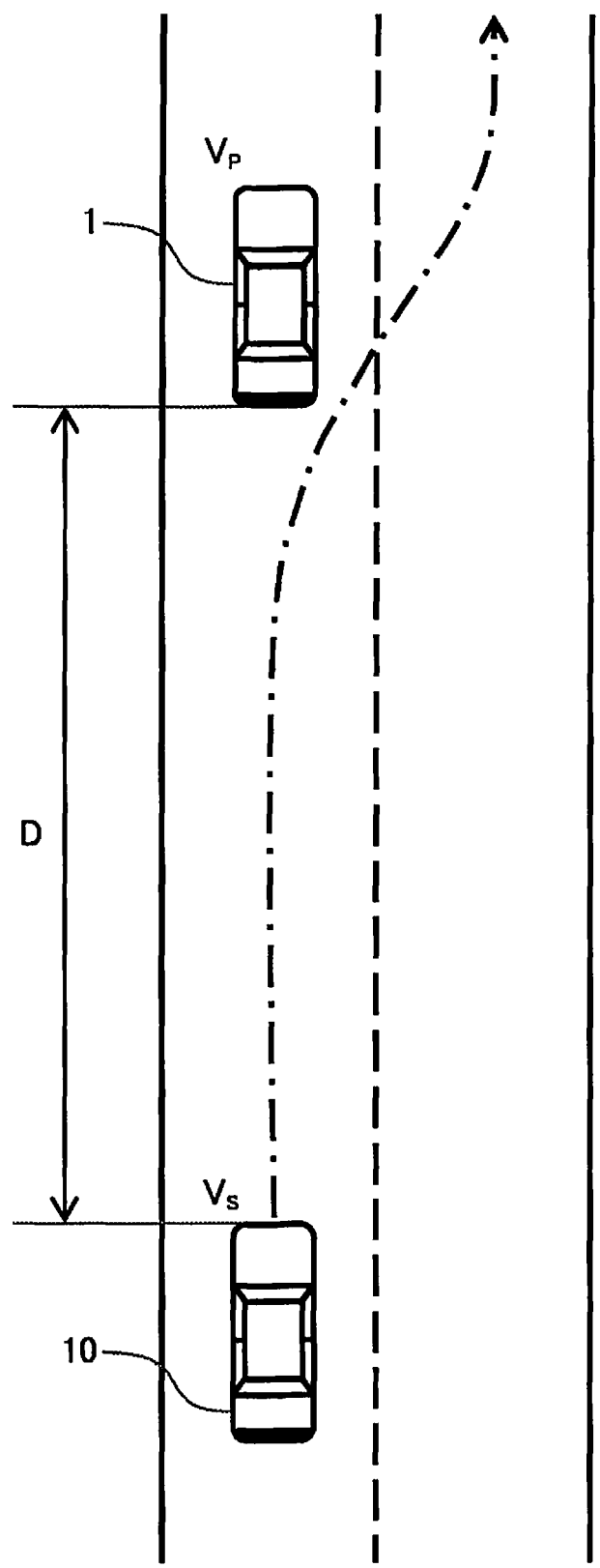
FIG. 3 is a conceptual view showing the basic flow of automated lane change control.
Figure 4:
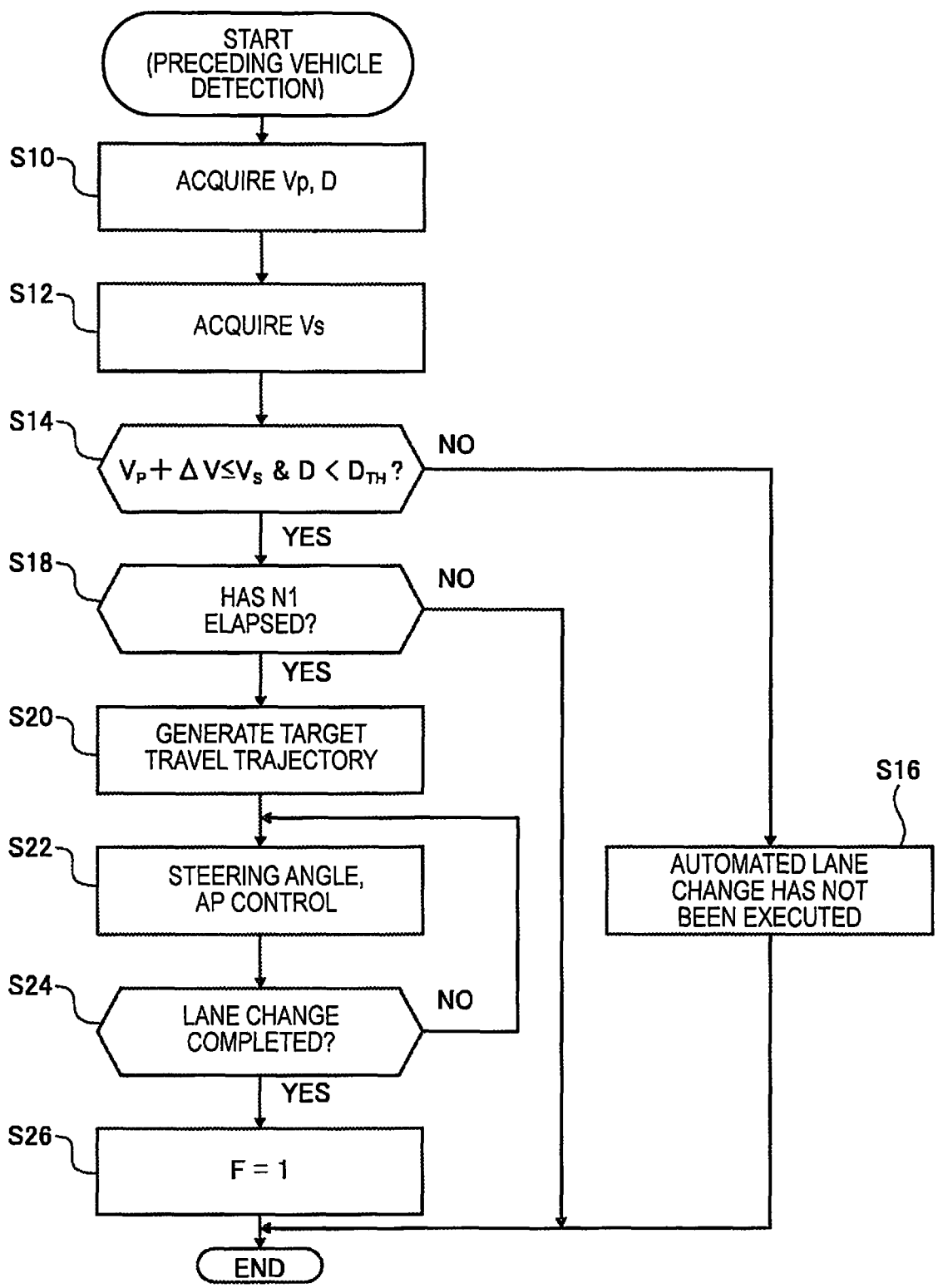
FIG. 4 is a flowchart related to the automated lane change control shown in FIG. 3.

As shown in FIG. 3, D is the headway distance between the preceding vehicle 1 and the host vehicle 10, $V_P$ is the speed of the preceding vehicle, and $V_S$ is the set speed for the host vehicle 10. During travel, the process shown in FIG. 4 is started when the host vehicle 10 detects the preceding vehicle 1 by using the object detection sensor 11 and the preceding-vehicle-assessment unit 14.

In S10, the speed $V_P$ of the preceding vehicle and the headway distance D are acquired using the detection unit (object detection sensor 11, preceding-vehicle-assessment unit 14). Next, the set speed $V_S$ for the host vehicle 10 set using the setting unit 20 is acquired in S12.

In S14, it is determined whether the condition (predetermined condition) for executing the automated lane change control of the host vehicle 10 is satisfied. Specifically, when the set speed $V_S$ for the host vehicle 10 is at least a default value $\Delta V$ greater than the vehicle speed $V_P$ of the preceding vehicle 1 (in other words, the relative speed of the host vehicle with respect to the preceding vehicle 1 is at least a default value $\Delta V$), and the headway distance D is less than a threshold value $D_{TH}$, it is determined that the predetermined condition is satisfied. The default value $\Delta V$ is, e.g., 15 km/h, and the threshold value $D_{TH}$ is, e.g., 60 m.

In S14, it is possible to determine that the predetermined condition is satisfied when only one of the following cases occur: the set speed $V_S$ of the host vehicle 10 is at least a default value $\Delta V$ greater than the vehicle speed $V_P$ of the preceding vehicle 1; and the headway distance D is less than the threshold value $D_{TH}$. In lieu of the above-stated condition, or in addition to the above stated condition, it is also possible to determine that the predetermined condition is satisfied when the time to collision (TTC) with the preceding vehicle 1 is calculated, and the calculated time to collision is less than a default time.

When the determination of S14 is negative, the program proceeds to S16 and the program ends without automated lane change control being executed. When the determination of S14 is affirmative, the program proceeds to S18, and it is determined whether a predetermined time N (more precisely, a first predetermined time N1) has elapsed after the preceding vehicle 1 has been detected. The value of the first predetermined time N1 is, e.g., about 5 seconds.

When the determination of S18 is negative, the program ends without the process (described later) being executed. When the determination of S18 is affirmative, the program proceeds to S20. In other words, the process from S10 to S18 is repeated until the determination in S18 is affirmative. Although not described below, the host vehicle 10 executes automated following control with respect to the preceding vehicle 1 in an interval that ends when the predetermined time N elapses, in order to avoid coming into contact with the preceding vehicle 1. When the driver does not desire automated lane change control, the driver can forcibly interrupt the control via the setting unit 20 before the first predetermined time N1 elapses. In other words, when the determination of S18 is affirmative, it can be determined that the consent of the driver has been obtained in relation to automated lane change.

In S20, the target trajectory of the host vehicle 10 is generated by the target trajectory generation unit 21, as shown by the dotted chain line in FIG. 3. Next, in S22, the steering angle and the accelerator position are controlled via the various actuators 32 based on the target trajectory generated in S20. The control in S22 is repeated until the lane change is completed.

When the lane change in S24 has been completed, that is, when it has been determined that the target trajectory has been run, the process proceeds to S26. In S26, the value of a flag F (initial value=0) is set to 1, indicating that automated lane change control has been executed. The completion of automated lane change control is determined by recognition of the positions of the host vehicle 10 and the white line from the information acquired by the peripheral-state-acquisition unit 15 and the GPS receiver 13.

Although a detailed description is omitted, the matter of whether automated lane change control can be executed is determined in the process from S22 to S24 based on the surroundings of the host vehicle 10 acquired from the monitoring unit (monitoring camera 12, peripheral-state-acquisition unit 15). For example, when another vehicle is present in the target trajectory, execution of automated lane change control is prohibited (execution of automated lane change control is not permitted).

Figure 5:
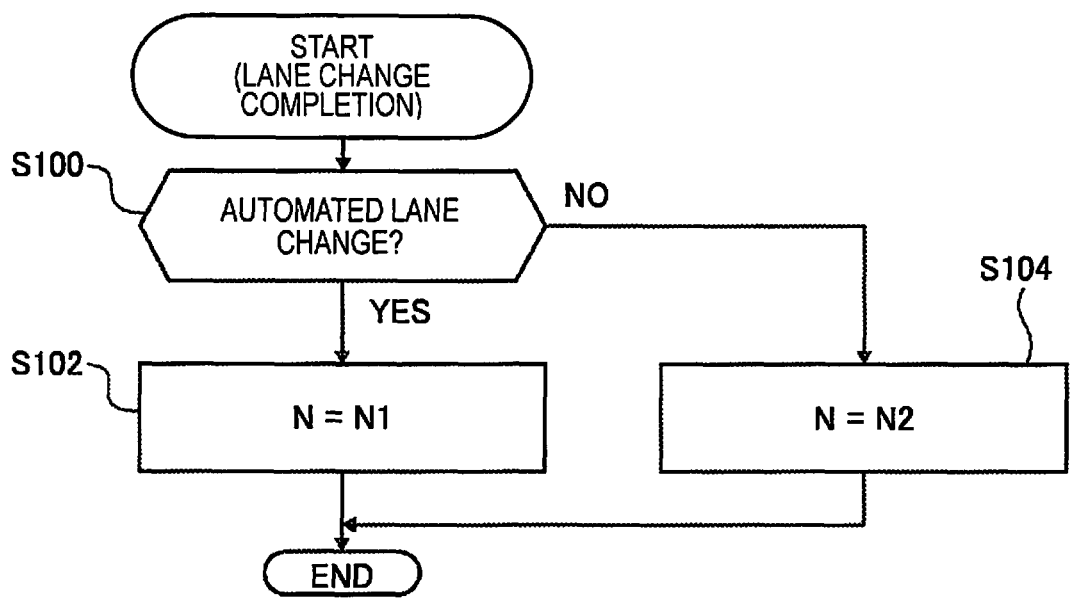
FIG. 5 is a flowchart of the automated lane change control pertaining to the present disclosure.

Next, the automated lane change control pertaining to the first embodiment will be described with reference to FIGS. 5 and 6. The flowchart of FIG. 5 is started when lane changing of the host vehicle 10 is complete.

In S100, it is determined whether the completed lane change was a lane change made through automated control. This determination is made by the lane change management unit 27 of the second unit 200. Specifically, the determination of S100 is made according to the existence of an operation of the direction indicator of the setting unit 20 and the value of the flag F set in S26 of the flowchart in FIG. 4.

When the determination of S100 is affirmative, the program proceeds to S102 and the initial value (first predetermined time N1) is maintained as the value of the predetermined time N, which is the standby time until automated lane change control is executed. When the determination of S100 is negative, the program proceeds to S104, and the value of the predetermined time N is set to a second predetermined time N2, which is longer than the first predetermined time N1. The value of the second predetermined time N2 is, e.g., about 3 minutes. The notification unit 33 causes a light to illuminate in a constant or intermittent manner while the second predetermined time N2 is being counted. The driver can thereby be notified of the fact that automated lane change control has been prohibited and can be prevented from having any concerns about the automated lane change control not being executed.

As described above, when the completed lane change was carried out through automated control, the predetermined time N to be used in the next lane change is kept at the initial value (first predetermined time N1). When the completed lane change was not carried out through automated control and instead in accordance with the intent of the driver, the predetermined time N is set to the second predetermined time N2, which is longer than the initial value. In other words, it is possible that the driver desires to remain in the lane currently being traveled by the host vehicle 10 because the lane was selected by the driver. Another interpretation is that continuing to execute further lane changes may not conform to the intent of the driver. Therefore, in such a case, automated lane change control is prohibited until the longer second predetermined time N2 elapses, even when the conventional predetermined time (first predetermined time N1) has elapsed.

A lane change in accordance with the intent of the driver includes, in addition to a steering operation by the driver, the case in which the lane change was directed by the driver to the host vehicle 10 via the direction indicator, etc., during automated driving control of the host vehicle 10.

Figure 6:
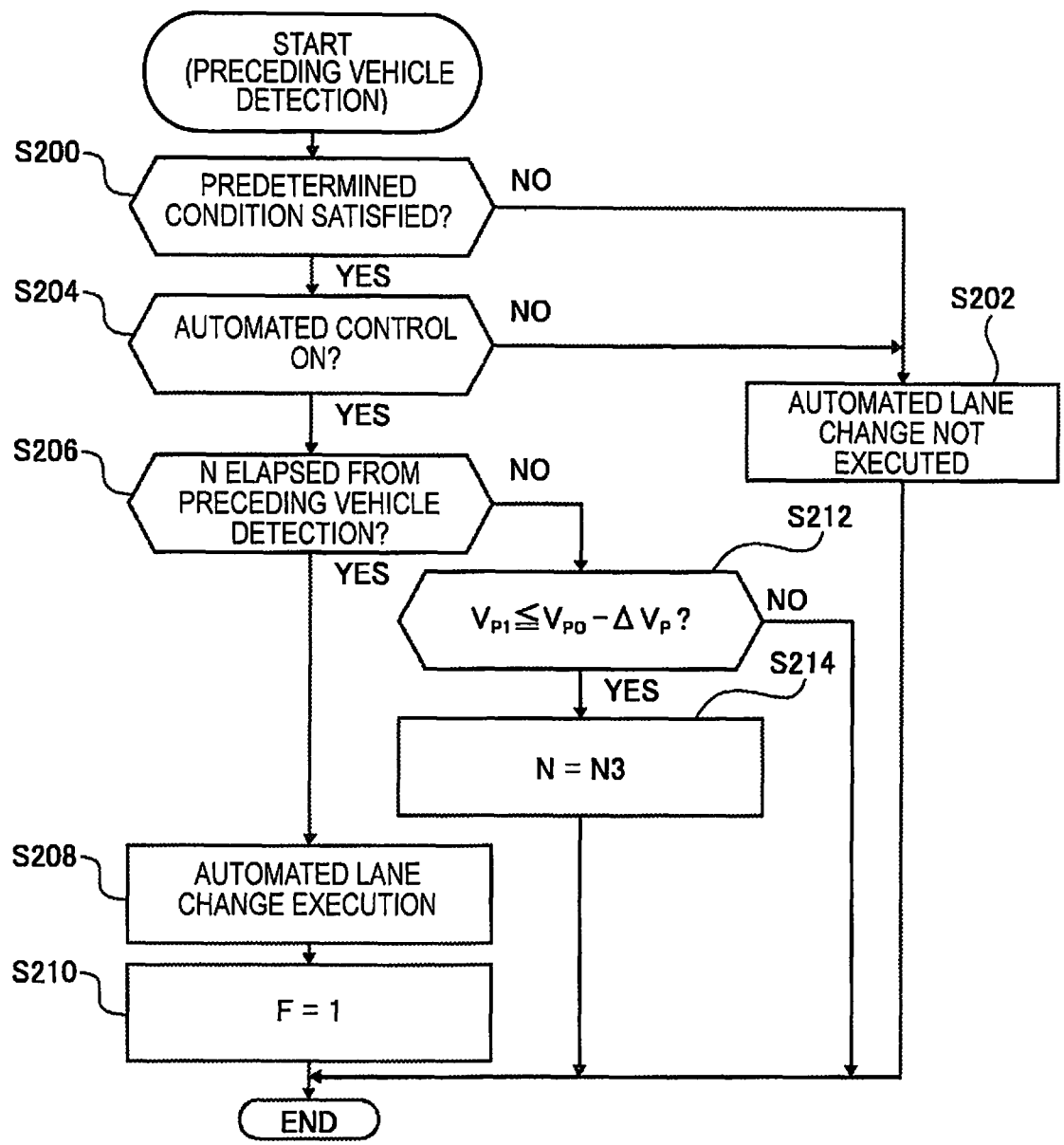
FIG. 6 is a flowchart of the automated lane change control in accordance with a first embodiment.

When a new preceding vehicle 1 has been detected after an automated lane change, the flowchart in FIG. 6 is started. In S200, it is determined whether the predetermined condition for executing automated lane change control is satisfied. In addition to the condition shown in S14 of FIG. 4, the predetermined condition of S200 is used to determine whether the previous lane change was completed.

When the determination of S200 is negative, the program proceeds to S202 and automated lane change control is not executed. When the determination of S200 is affirmative, the program proceeds to S204 and it is determined whether the automated lane change control function is ON. In the additional case in which the driver of the host vehicle 10 does not desire automated lane change control and the control has been forcibly interrupted, the determination of S204 is negative.

When the determination of S204 is negative, the program proceeds to S202 and automated lane change control is not executed. When the determination of S204 is affirmative, the program proceeds to S206, and it is determined whether a predetermined time N has elapsed from detection of the new preceding vehicle 1. The value (first predetermined time N1 or second predetermined time N2) set in the flowchart in FIG. 5 is used as the predetermined time N in S206.

When the determination of S206 is affirmative, the program proceeds to S208 and automated lane change control is executed. When the automated lane change control of S208 is completed, the program proceeds to S210 and the value of the flag F, which indicates that automated lane change control has been executed, is set to 1. Although omitted in FIG. 6, between S208 and S210, it is determined whether the lane change has been completed, in the same manner as S22 and S24 of the flowchart in FIG. 4.

When the determination of S206 is negative, the program proceeds to S212, and it is determined whether the difference between the preceding vehicle speed $V_{P0}$ immediately after the preceding vehicle 1 is detected and the current vehicle speed $V_{P1}$ of the preceding vehicle 1 is equal to or greater than a predetermined difference $\Delta V_P$. When the determination of S212 is affirmative; in other words, when it has been determined that, after the preceding vehicle 1 is detected, the preceding vehicle 1 has decelerated by at least the predetermined difference $\Delta V_P$, the program proceeds to S214. In step S214, the predetermined time N is set to a third predetermined time N3. The predetermined difference $\Delta V_P$ is, e.g., 20 km/h. The third predetermined time N3 is a value that is equal to or greater than the first predetermined time N1 and less than the second predetermined time N2 (N1≤N3<N2), e.g., 5 to 8 seconds.

As a result, the flowchart in FIG. 6 is repeated using the third predetermined time N3 as the predetermined time N. When it has been determined that the predetermined time N (third predetermined time N3) has elapsed in S206, the program proceeds to S208 and automated lane change control is executed (FIG. 4: S20 to S24).

In other words, it is possible that the driver does not desire to remain in the same lane when there has been a major change in the travel state of the preceding vehicle 1, even when the previous lane change was in accordance with the intent of the driver. Therefore, in such case, the standby time until the automated lane change control is executed is switched to the third predetermined time N3, which is relatively short. Automated travel control can thereby be continued without discomfort to the driver.

When the determination of S212 is negative, it can be determined that there has been no major change to the travel state of the preceding vehicle 1, and the program is therefore ended without changing the predetermined time N. As a result, the flowchart in FIG. 6 is repeated while the current predetermined time N is maintained. When it has been determined that the predetermined time N has elapsed in S206, the program proceeds to S208 and automated lane change control is executed (FIG. 4: S20 to S24).

In the determination of S212, the following condition may be added in addition to or in lieu of that which is described above. In other words, it is determined whether the host vehicle 10 must decelerate by at least a predetermined deceleration amount in an interval that starts when the new preceding vehicle 1 is detected and ends when the predetermined time N elapses, or whether the relative speed of the host vehicle 10 with respect to the preceding vehicle 1 is at least a predetermined value.

In other words, although there is no major change in the travel state of the preceding vehicle 1, there may be a case in which the travel state of the host vehicle 10 undergoes a major change when the control for automated following of the preceding vehicle 1 is executed for a relatively long period of time (in particular, during the second predetermined time N2). In such a case, it is possible that the driver does not desire to remain in the same lane for a long period of time, even when the previous lane change was in accordance with the intent of the driver. Therefore, when the above-described additional determination is affirmative, the standby time until the automated lane change control is executed may be switched to the third predetermined time N3, which is relatively short.

It is possible that the driver desires to make a further lane change without waiting for the second predetermined time N2 to elapse, even when the previous lane change was in accordance with the intent of the driver. In such a case, the driver can cancel the setting of the second predetermined time N2 using the setting unit 20. In other words, the driver can cancel the prohibiting of the automated lane change control before the second predetermined time N2 elapses.

A dedicated switch may be provided to the setting unit 20 as means for canceling prohibiting of automated lane change control. Alternatively, the cancellation may be implemented by operation of the direction indicator constituting the setting unit 20. Cancellation may optionally be implemented by setting the ON/OFF switch for automated lane change control of the setting unit 20 to OFF, or the switch may be pressed twice.

As described above, the first embodiment describes an automated lane change control method in which a preceding vehicle 1 traveling in a same travel lane as a host vehicle 10 is detected, a determination is made as to whether a predetermined condition is satisfied based on a correlation ($V_S$, $V_P$, D) between the host vehicle 10 and the preceding vehicle 1 (S14), and lane changing by the host vehicle 10 is executed via automated control after a first predetermined time N1 has elapsed from determining that the predetermined condition is satisfied. An assessment is made as to whether a previous lane change made by the host vehicle 10 is in accordance with an intent of a driver (S100), when the assessment is that the previous lane change is in accordance with the intent of the driver, a second predetermined time N2 that is longer than the first predetermined time N1 is set as a time over which a lane change performed through the automated control is prohibited, and the lane change performed through the automated control is prohibited in an interval that starts when a prohibiting condition that prohibits a lane change performed through the automated control is satisfied and ends when the second predetermined time N2 elapses (S104, S200, S204, S206). Automated lane change control that respects the intent of the driver can thereby be realized.

In other words, it is possible that, when the previous lane change is carried out in accordance with the intent of the driver, the driver desires to remain in the lane resulting from the lane change. A risk is accordingly presented in that the driver will not be comfortable when the lane change is consecutively executed by the automated driving control after a previous lane change has occurred in accordance with the intent of the driver. In view thereof, in the first embodiment, automated lane change control is prohibited until the second predetermined time N2, which is longer than a conventional time (first predetermined time N1), elapses after a lane change in accordance with the intent of the driver.

In the control method of the first embodiment, the prohibiting condition is satisfied when the previous lane change in accordance with the intent of the driver is determined to have been completed and the condition (predetermined condition) for executing the automated lane change control of the host vehicle 10 is satisfied (S200). Consequently, the lane change performed through automated control is prohibited until the second predetermined time N2 elapses after the prohibiting condition is satisfied (S104, S200, S204, and S206). Automated lane change control that respects the intent of the driver can thereby be realized.

In the control method of the first embodiment, the preceding vehicle 1 is detected after the previous lane change in accordance with the intent of the driver is completed, and when a determination is made, based on the correlation ($V_S$, $V_P$, D) between the host vehicle 10 and the preceding vehicle 1, that the host vehicle 10 must decelerate by at least a predetermined deceleration amount, or when it has been determined that the relative speed ($V_S$–$V_P$) of the host vehicle 10 with respect to the new preceding vehicle 1 is at least a predetermined value, a lane change performed through automated control is prohibited until a third predetermined time N3 elapses, the third predetermined time N3 being equal to or greater than the first predetermined time N1 after the prohibiting condition is satisfied and less than the second predetermined time N2 (S214, S206, S208). Automated driving control can thereby be continued without discomfort to the driver.

As described above, it is possible that, when a previous lane change in accordance with the intent of the driver has been carried out, the driver desires to remain in the lane resulting from the lane change. However, there may be a case in which the speed of the host vehicle 10 must be dramatically reduced after a lane change. In such a case, it is possible that the driver desires a lane change contrary to initial intent. Therefore, in such a case, the control method is configured such that automated lane change control is executed at an early stage without waiting for the second predetermined time N2.

In the control method of the first embodiment, the preceding vehicle 1 is detected after the previous lane change in accordance with the intent of the driver is completed, a determination is made as to whether a difference between the vehicle speed $V_{P0}$ of the preceding vehicle 1 at the time of detection and the current vehicle speed $V_{P1}$ of the preceding vehicle 1 is at least a predetermined difference (S212), and when the difference is determined to be at least a predetermined difference $V_P$, a lane change made through the automated control is prohibited until a third predetermined time N3 elapses, the third predetermined time N3 being equal to or greater than the first predetermined time N1 after the prohibiting condition is satisfied and less than the second predetermined time N2 (S214, S206, S208). Automated driving control can thereby be continued without causing discomfort to the driver.

Even when the previous lane change has been made in accordance with the intent of the driver, the relative speed with respect to the host vehicle 10 may thereafter be reduced due to deceleration by the preceding vehicle 1. In such a case, there is a risk that the driver will be made uncomfortable when the automated lane change control is prohibited until the second predetermined time N2 elapses. Therefore, in such a case, the control method is configured such that automated lane change control is executed at an early stage without waiting for the second predetermined time N2.

In the control method of the first embodiment, the driver of the host vehicle 10 is notified that the lane change performed through automated control is prohibited in an interval that starts when the prohibition condition is satisfied and ends when the second predetermined time N2 elapses (notification unit 33). The driver can thereby be prevented from feeling uncertain about the automated lane change control not being executed.

The notification made by the notification unit 33 may be a display of the remaining time until the second predetermined time N2 elapses. The driver can thereby be notified of the time when the automated lane change control will be restarted.

In the control method of the first embodiment, it is possible to cancel the prohibiting of lane change performed through automated control in an interval that starts when the prohibiting condition is satisfied and ends when the second predetermined time N2 elapses. Automated lane change control that respects the intent of the driver can thereby be realized.

In the control method of the first embodiment, the predetermined condition is at least one of the relative speed ($V_S$–$V_P$) of the host vehicle 10 with respect to the preceding vehicle 1 being at least a default value ΔV, the relative position between the host vehicle 10 and the preceding vehicle 1 (headway distance D) being less than a predetermined distance (threshold value) $D_{TH}$, and the predicted time to collision (TTC) with the preceding vehicle 1 being less than a default time. Automated lane change control can thereby be executed with appropriate timing.

The automated lane change control device of the first embodiment comprises: a control unit (target trajectory generation unit 21, an actual-trajectory-computation unit 25, a correction amount calculation unit 26, a lane change management unit 27, and a travel control unit 31) for automatically controlling at least the steering of the host vehicle 10; a detection unit (the object detection sensor 11, and the preceding-vehicle-assessment unit 14) for detecting a preceding vehicle 1 traveling in the same lane as the host vehicle 10; and an assessment unit (the lane change management unit 27) for assessing that a lane change has been executed in accordance with the intent of the driver. The control unit is configured so as to execute the lane change made by the host vehicle 10 through automated control after the first predetermined time N1 has elapsed after it has been determined that predetermined condition has been satisfied based on the correlation ($V_S$, $V_P$, D) between the host vehicle 10 and the preceding vehicle 1 (S14, S18 to S24). However, the control unit is configured so as to set a second predetermined time N2, which is longer than the first predetermined time N1, as the time over which a lane change performed through automated control is prohibited, in the case an assessment has been made that the previous lane change was intentionally executed by the driver (S100, S104), and prohibit the lane change performed through the automated control in an interval that starts when the prohibiting condition that prohibits a lane change performed through the automated control is satisfied and ends when the second predetermined time N2 elapses (S200, S204, S206). Automated lane change control that respects the intent of the driver can thereby be realized in the same manner as the control method described above.

Second Embodiment

Figure 7:
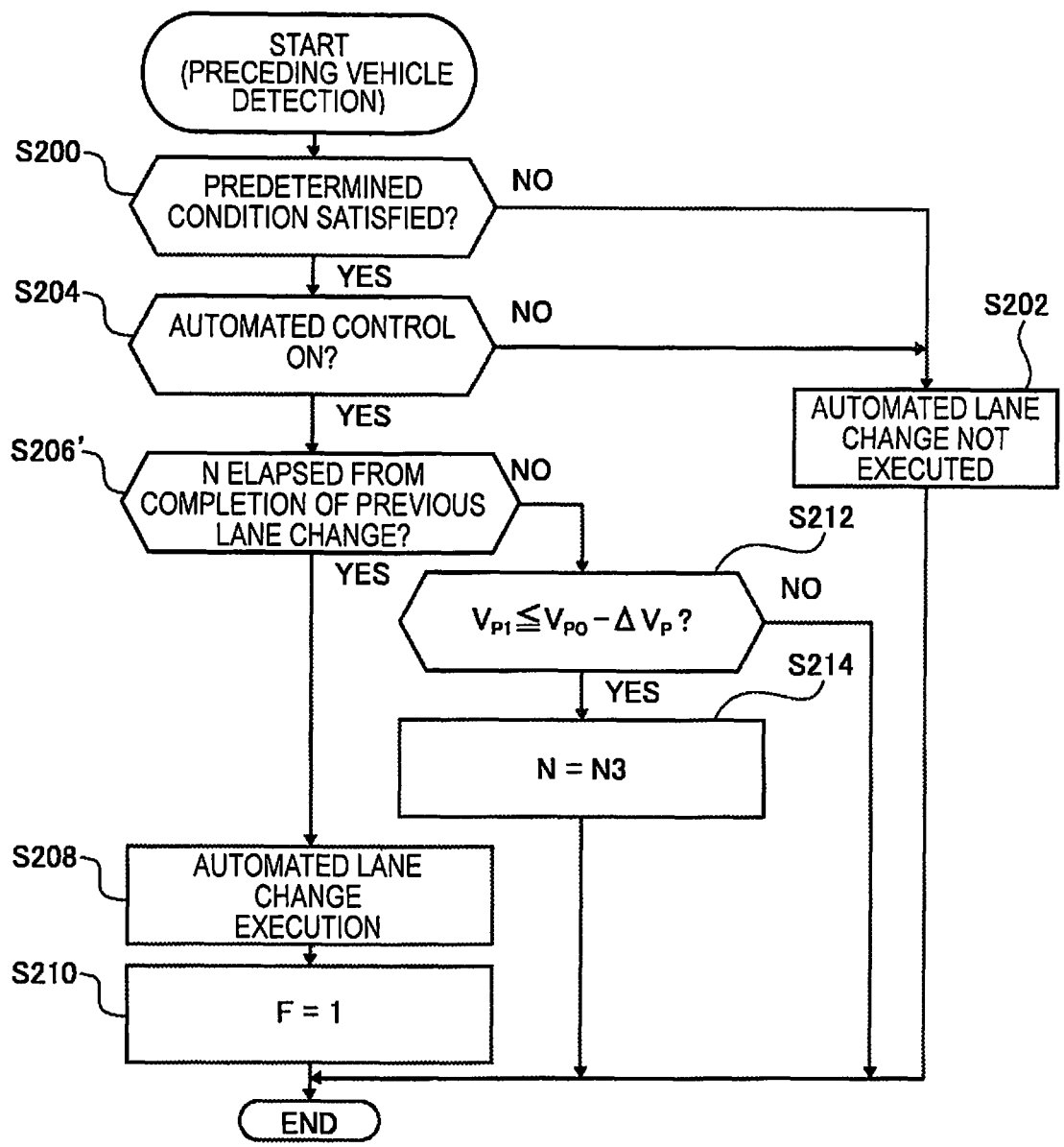
FIG. 7 is a flowchart of the automated lane change control in accordance with a second embodiment.

The automated lane change control method and device pertaining to the second embodiment of the present disclosure will be described with reference to FIG. 7. In FIG. 7, the same steps as in the first embodiment are assigned the same reference numerals as FIG. 6.

As in the first embodiment, when the lane change of host vehicle 10 is completed, a predetermined time N is set in accordance with the flowchart of FIG. 5 (FIG. 5: S100 to S104). When a new preceding vehicle 1 has been detected after a lane change, the flowchart in FIG. 7 is executed.

In the flowchart of FIG. 7, the process from S200 to S204 is carried out in the same manner as the first embodiment. In S206', it is determined whether the predetermined time N has elapsed from the completion of the previous lane change. As described above, in the automated lane change control pertaining to the first embodiment, when the previous lane change has been completed and the predetermined condition for executing the automated lane change control is satisfied, the prohibiting condition is satisfied and counting of the predetermined time N is started. In the automated lane change control method and device pertaining to the second embodiment, when it has been determined that the previous lane change has been completed, the prohibiting condition is satisfied and counting of the predetermined time N is started.

Depending on road conditions, there may be cases in which the preceding vehicle 1 is not detected for a while even after a lane change. In such a case, the current lane is traveled in for a fixed length of time in an interval that ends when a new preceding vehicle 1 is detected. Accordingly, the driver is not made to feel uncomfortable even if the automated lane change control is immediately executed after the new preceding vehicle 1 is detected. Therefore, in the second embodiment, when it has been determined that the previous lane change has been completed, counting of the predetermined time N is started.

The remaining process (S208 to S214) is the same as in the flowchart of FIG. 6 of the first embodiment, and is thus not described here.

In view of the above, in the second embodiment, a lane change performed through automated control is prohibited until the second predetermined time N2 elapses after the completion of a lane change in accordance with the intent of the driver (S206'). In other words, after a lane change, counting of the second predetermined time N2 is executed whether or not a preceding vehicle 1 is present. The automated lane change control can thereby be smoothly started when, e.g., the preceding vehicle 1 has been detected after at least the second predetermined time has elapsed after a lane change has been completed.

The automated lane change control method and device of the present disclosure are described above based on embodiments 1 and 2. However, the specific configuration is not limited to these embodiments; design changes, additions, etc., are permitted provided there is no departure from the spirit of the invention according to each of the claims.

For example, specific numerical values were shown in the embodiments as values of the predetermined time N (first predetermined time N1, second predetermined time N2, third predetermined time N3). However, these numerical values are merely for illustration. The predetermined time N may vary in accordance with the speed of the host vehicle 10 and the preceding vehicle 1.

In the embodiments, a light or the remaining time of the second predetermined time N2 is displayed as the notification unit 33. However, a microphone may be provided to the notification unit 33 and various notifications may be provided by audio.

In the embodiments, only examples of changing the lane of the host vehicle 10 are shown as the automated lane change control. However, the present disclosure is an example of automated driving, and it is obvious that application can also be made to the case of executing an automated lane change in order to pass a preceding vehicle, and, after the preceding vehicle has been passed, executing automated passing control for automatic return to the original lane.

The invention claimed is:

1. An automated lane change control method for at least automatically controlling steering in a host vehicle, the automated lane change control method comprising:
   detecting a preceding vehicle traveling in a same travel lane as the host vehicle;
   determining whether or not a predetermined condition is satisfied based on a correlation between the host vehicle and the preceding vehicle;
   assessing whether or not a previous lane change made by the host vehicle is in accordance with an intent of a driver;
   executing automatically a lane change by the host vehicle via an automated control after a first predetermined time has elapsed from determining that the predetermined condition is satisfied;
   setting a second predetermined time that is longer than the first predetermined time as a time for prohibited the lane change to be performed through the automated control upon assessing that the previous lane change was in accordance with the intent of the driver; and
   prohibiting the lane change performed through the automated control while permitting a driver intended lane change in an interval that starts when a prohibiting condition that prohibits the lane change performed through the automated control is satisfied and ends when the second predetermined time elapses.

2. The automated lane change control method according to claim 1, wherein the prohibiting condition is satisfied when the previous lane change in accordance with the intent of the driver is determined to have been completed.

3. The automated lane change control method according to claim 2, wherein
   the detecting of the preceding vehicle is preformed after the previous lane change in accordance with the intent of the driver has been completed, and the prohibiting of the lane change performed through the automated control continued is until a third predetermined time elapses, upon determining based on a correlation between the host vehicle and the preceding vehicle that the host vehicle must decelerate by at least a predetermined deceleration amount or that a relative speed of the host vehicle with respect to the preceding vehicle is at least a predetermined value, the third predetermined time being equal to or greater than the first predetermined time after the prohibiting condition is satisfied and less than the second predetermined time.

4. The automated lane change control method according to claim 2, wherein
the detecting of the preceding vehicle is preformed after the previous lane change in accordance with the intent of the driver has been completed,
determining whether or not a difference between a vehicle speed of the preceding vehicle at a time of detection and a current vehicle speed of the preceding vehicle is at least a predetermined difference, and
the prohibiting of the lane change performed through the automated control is continued until a third predetermined time elapses, upon determining the difference is determined to be at least the predetermined difference, the third predetermined time being equal to or greater than the first predetermined time after the prohibiting condition is satisfied and less than the second predetermined time.

5. The automated lane change control method according to claim 1, wherein
the prohibiting condition is satisfied when the previous lane change in accordance with the intent of the driver is determined to have been completed and the predetermined condition is satisfied.

6. The automated lane change control method according to claim 1, further comprising
notifying the driver of the host vehicle that the lane change performed through automated control is prohibited in an interval that starts when the prohibition condition is satisfied and ends when the second predetermined time elapses.

7. The automated lane change control method according to claim 6, wherein
the notifying includes displaying a remaining time until the second predetermined time elapses.

8. The automated lane change control method according to claim 1, wherein
the prohibiting of a lane change performed through automated control can be canceled in an interval that starts when the prohibiting condition is satisfied and ends when until the second predetermined time elapses.

9. The automated lane change control method according to claim 1, wherein
the predetermined condition includes at least one of:
a relative speed of the host vehicle with respect to the preceding vehicle be at least a default value;
a relative position between the host vehicle and the preceding vehicle be less than a predetermined distance; and
a predicted time to collision with the preceding vehicle be less than a default time.

10. An automated lane change control device comprising:
a processor including
a control unit configured to automatically control at least steering of a host vehicle;
a detection unit configured to detect a preceding vehicle traveling in a same travel lane as the host vehicle; and
an assessment unit configured to assess that a lane change has been executed in accordance with an intent of a driver,
the control unit being configured to execute a lane change of the host vehicle by an automated control after a first predetermined time has elapsed after determining that a predetermined condition has been satisfied based on a correlation between the host vehicle and the preceding vehicle, and
the control unit being configured to set a second predetermined time that is longer than the first predetermined time as a time for prohibiting the lane change performed through the automated control upon assessing that a previous lane change was in accordance with the intent of the driver, and to prohibit the lane change performed through the automated control while permitting a driver intended lane change in an interval that starts when a prohibiting condition that prohibits the lane change performed through the automated control is satisfied and ends when the second predetermined time elapses.

* * * * *